United States Patent
Yadav et al.

(10) Patent No.: US 11,961,670 B1
(45) Date of Patent: Apr. 16, 2024

(54) SYSTEM INCLUDING A BENT CAPACITOR BUS BAR

(71) Applicant: Delphi Technologies IP Limited, St Michael (BB)

(72) Inventors: Rajesh Mittu Ram Yadav, Woodlands (SG); Teng Zhi Jau, Ang Mo Kio (SG); Wayne Anthony Sozansky, Blanco, TX (US)

(73) Assignee: Delphi Technologies IP Limited, St Michael (BB)

( * ) Notice: Subject to any disclaimer, the term of this patent is extended or adjusted under 35 U.S.C. 154(b) by 0 days.

(21) Appl. No.: 17/938,629

(22) Filed: Oct. 6, 2022

(51) Int. Cl.
*H01G 2/06* (2006.01)
*H01G 4/228* (2006.01)

(52) U.S. Cl.
CPC ............. *H01G 2/065* (2013.01); *H01G 4/228* (2013.01)

(58) Field of Classification Search
None
See application file for complete search history.

(56) References Cited

U.S. PATENT DOCUMENTS

| | | | | |
|---|---|---|---|---|
| 3,806,770 A | * | 4/1974 | Voyles | H01G 4/228 29/25.35 |
| 7,002,789 B1 | * | 2/2006 | Georgopoulos | H01G 4/38 29/25.42 |
| 9,073,149 B2 | | 7/2015 | Raschke | |
| 2005/0263845 A1 | * | 12/2005 | Saito | H01G 4/38 257/532 |
| 2013/0271941 A1 | | 10/2013 | Guan et al. | |
| 2014/0141287 A1 | | 5/2014 | Bertucci et al. | |
| 2018/0075973 A1 | | 3/2018 | Ando et al. | |
| 2021/0006177 A1 | | 1/2021 | Uneme | |
| 2022/0407431 A1 | * | 12/2022 | Nakata | H05K 7/20927 |

FOREIGN PATENT DOCUMENTS

| | | | |
|---|---|---|---|
| CN | 105304836 A | 2/2016 | |
| CN | 109732209 A | 5/2019 | |
| DE | 102016106835 | 6/2017 | |
| EP | 01303861 A1 * | 1/1985 | |
| EP | 3480832 A1 | 5/2019 | |
| JP | 2009044891 A * | 2/2009 | ............ H02M 7/003 |
| KR | 20160127214 A * | 11/2016 | |

* cited by examiner

*Primary Examiner* — Eric W Thomas

(74) *Attorney, Agent, or Firm* — Joshua M. Haines; Bookoff McAndrews, PLLC

(57) ABSTRACT

A system may include a capacitor for an electronic device of an electric vehicle; a main bus bar; and a capacitor bus bar configured to connect the capacitor to the main bus bar, wherein the capacitor bus bar includes a first portion that is perpendicular to the main bus bar, and wherein the capacitor bus bar includes a second portion that extends from the first portion, that is perpendicular to the first portion, and that is planar with the main bus bar.

20 Claims, 9 Drawing Sheets

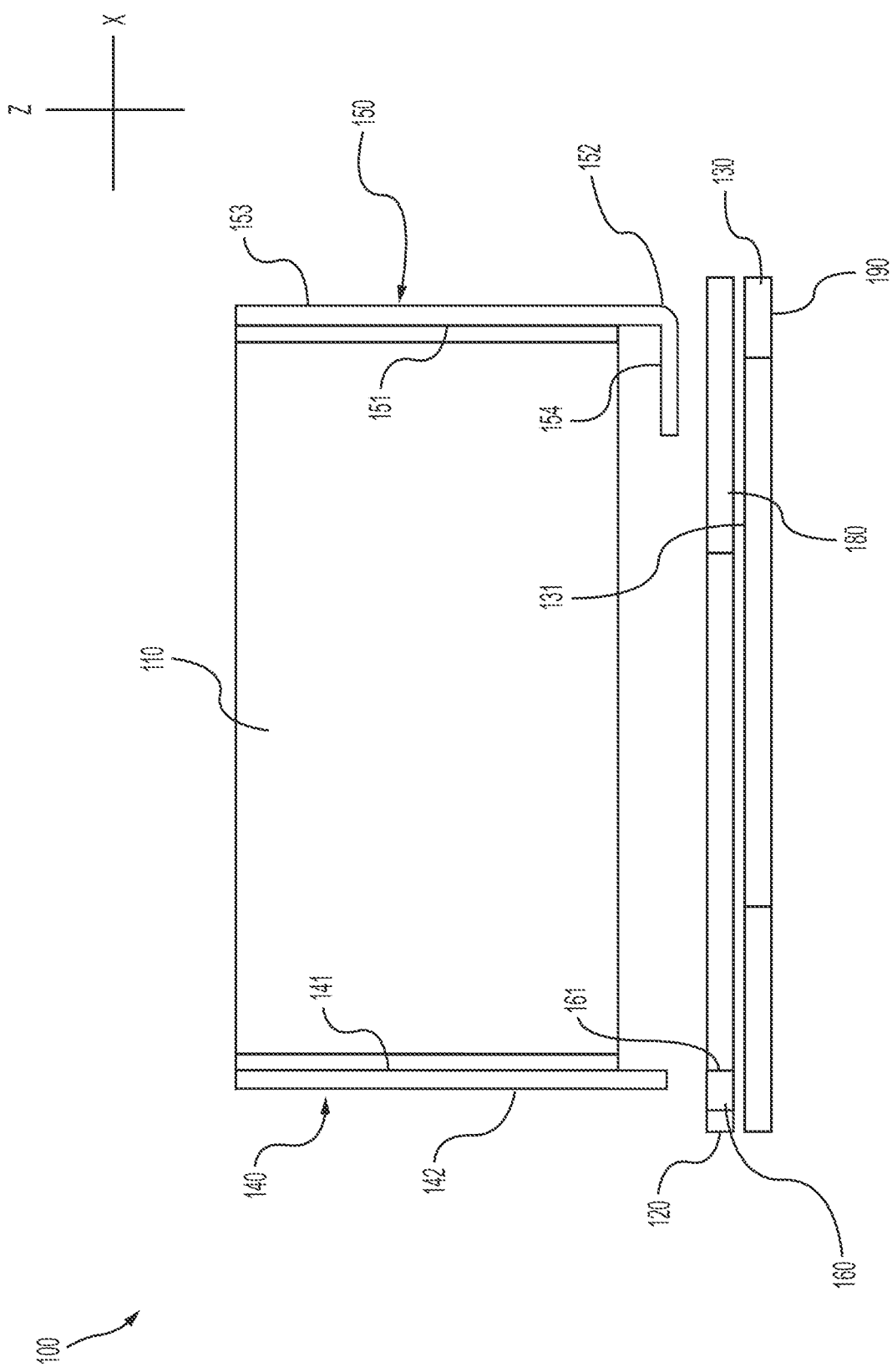

SYSTEM INCLUDING A BENT CAPACITOR BUS BAR

TECHNICAL FIELD

The present disclosure relates to a system including a capacitor for an electronic device of an electric vehicle, a set of main bus bars, and a set of capacitor bus bars for connecting the capacitor to the main bus bars. More specifically, the present disclosure relates to a system including a bent capacitor bus bar for connecting the capacitor to a main bus bar via a laser weld.

BACKGROUND

A capacitor (e.g., a bulk capacitor, a DC-link capacitor, or the like) stabilizes an output of a power supply during situations where current is not available. Capacitors include various applications, and may be generally found in vehicles, renewable energy devices, medical devices, consumer devices, etc.

An electric vehicle may include a capacitor for an electronic device, such as an inverter, a converter, or the like. The capacitor may connect to main bus bars of the electric vehicle via capacitor bus bars. The main bus bars may include respective cavities into which the capacitor bus bars are inserted. Further, the capacitor bus bars may be laser welded to internal circumferential surfaces of the cavities of the bus bars. The capacitor bus bars might be substantially straight. Accordingly, and in some cases, a gap may exist between an internal circumferential surface of a main bus bar and a capacitor bus bar. For instance, dimensional variance of the capacitor may cause such a gap to exist. In this case, the capacitor bus bar might not be capable of being welded to the main bus bar, or a connection between the capacitor bus bar and the main bus bar might be ineffective or error-prone. Accordingly, a need exists for an improved connection between the capacitor bus bars and the main bus bars that accommodates dimensional variance in the capacitor.

SUMMARY

According to an example embodiment, a system may include a capacitor for an electronic device of an electric vehicle; a main bus bar; and a capacitor bus bar configured to connect the capacitor to the main bus bar, wherein the capacitor bus bar includes a first portion that is perpendicular to the main bus bar, and wherein the capacitor bus bar includes a second portion that extends from the first portion, that is perpendicular to the first portion, and that is planar with the main bus bar.

The capacitor bus bar may be laser welded to the main bus bar.

The capacitor may be a DC-link capacitor.

The capacitor may be provided above the main bus bar in a vertical direction, and the capacitor bus bar may be provided on a side of the capacitor in a horizontal direction.

The capacitor may be provided below the main bus bar in a vertical direction, and the capacitor bus bar may be provided on a side of the capacitor in a horizontal direction.

The system may include a second main bus bar; and a second capacitor bus bar. The second bus bar may include a cavity through which the second capacitor bus bar extends.

The system may include a second main bus bar; and a second capacitor bus bar. The second bus bar may include a cavity through which the second capacitor bus bar extends. The second capacitor bus bar may be welded to a side surface of the cavity.

The system may include a second main bus bar; and a second capacitor bus bar. The second bus bar may include a cavity through which the capacitor bus bar extends.

The capacitor bus bar may include an internal surface that faces the capacitor, and an external surface that faces away from the capacitor. The external surface may be welded to the main bus bar.

According to an example embodiment, an electric vehicle may include a capacitor for an electronic device of the electric vehicle; a main bus bar; and a capacitor bus bar configured to connect the capacitor to the main bus bar, wherein the capacitor bus bar includes a first portion that is perpendicular to the main bus bar, and wherein the capacitor bus bar includes a second portion that extends from the first portion, that is perpendicular to the first portion, and that is planar with the main bus bar.

The capacitor bus bar may be laser welded to the main bus bar.

The capacitor may be a DC-link capacitor.

The capacitor may be provided above the main bus bar in a vertical direction, and the capacitor bus bar may be provided on a side of the capacitor in a horizontal direction.

The capacitor may be provided below the main bus bar in a vertical direction, and the capacitor bus bar may be provided on a side of the capacitor in a horizontal direction.

The electric vehicle may include a second main bus bar; and a second capacitor bus bar. The second bus bar may include a cavity through which the second capacitor bus bar extends, and the second capacitor bus bar may be welded to a side surface of the cavity.

The capacitor bus bar may include an internal surface that faces the capacitor, and an external surface that faces away from the capacitor. The external surface may be welded to the main bus bar.

According to an example embodiment, a method of connecting a capacitor of an electric vehicle to a main bus bar of the electric vehicle may include laser welding a capacitor bus bar to the main bus bar to connect the capacitor to the main bus bar, wherein the capacitor bus bar includes a first portion that is perpendicular to the main bus bar, and wherein the capacitor bus bar includes a second portion that extends from the first portion, that is perpendicular to the first portion, and that is planar with the main bus bar.

The method may include extending the capacitor bus bar through a cavity of a second main bus bar.

The method may include laser welding a second capacitor bus bar to a second main bus bar to connect the capacitor to the second main bus bar. The second capacitor bus bar may include an internal surface that faces the capacitor, and an external surface that faces away from the capacitor. The internal surface may be laser welded to a cavity of the second main bus bar.

The capacitor bus bar may include an internal surface that faces the capacitor, and an external surface that faces away from the capacitor. The external surface may be laser welded to the main bus bar.

It may be understood that both the foregoing general description and the following detailed description are exemplary and explanatory only and are not restrictive of the invention, as claimed.

BRIEF DESCRIPTION OF THE DRAWINGS

FIGS. 1A and 1B are diagrams of a system, for connecting a capacitor to main bus bars, including a bent capacitor bus bar on a bottom right side.

DETAILED DESCRIPTION

Figure 1B:
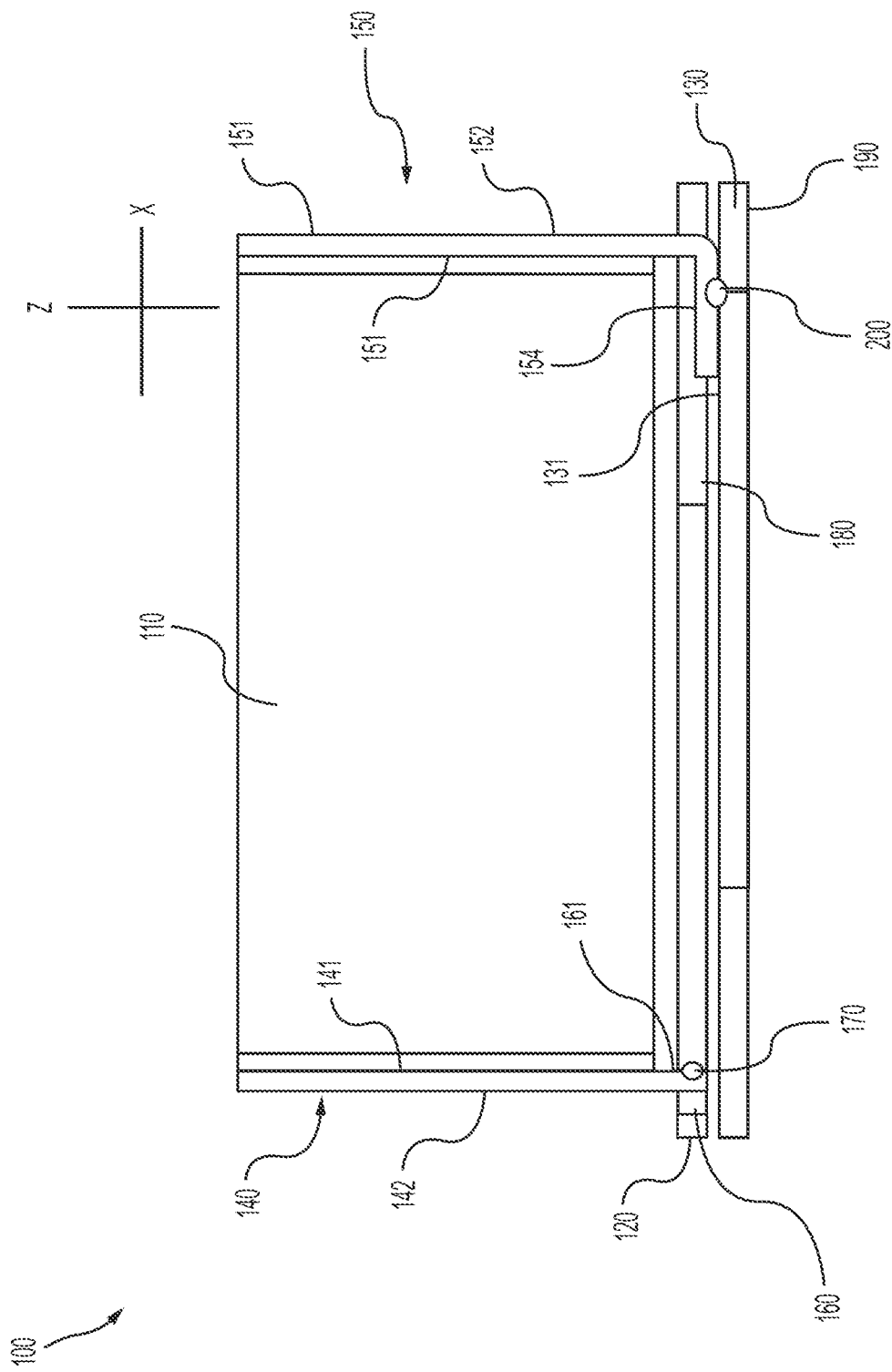

FIGS. 1A and 1B are diagrams of a system, for connecting a capacitor to main bus bars, including a bent capacitor bus bar on a first side, e.g., a bottom right side. As shown in FIGS. 1A and 1B, a system 100 may include a capacitor 110, a first main bus bar 120, a second main bus bar 130, a first capacitor bus bar 140, a second capacitor bus bar 150, a first cavity 160, a first weld 170, a second cavity 180, a third cavity 190, and a second weld 200. The first main bus bar 120 and the second main bus bar 130 may be substantially parallel to one another, and may be disposed along an axis in the X direction. The first capacitor bus bar 140 and the first portion 153 of the second capacitor bus bar 150 may be substantially parallel to each other, and may be disposed along an axis in the Z direction. The second portion 154 of the second capacitor bus bar 150 may be substantially perpendicular to the first portion 153 of the second capacitor bus bar 150 and the first capacitor bus bar 140, may be substantially parallel to the first main bus bar 120 and the second main bus bar 130, and may be disposed along the X axis.

Figure 5:
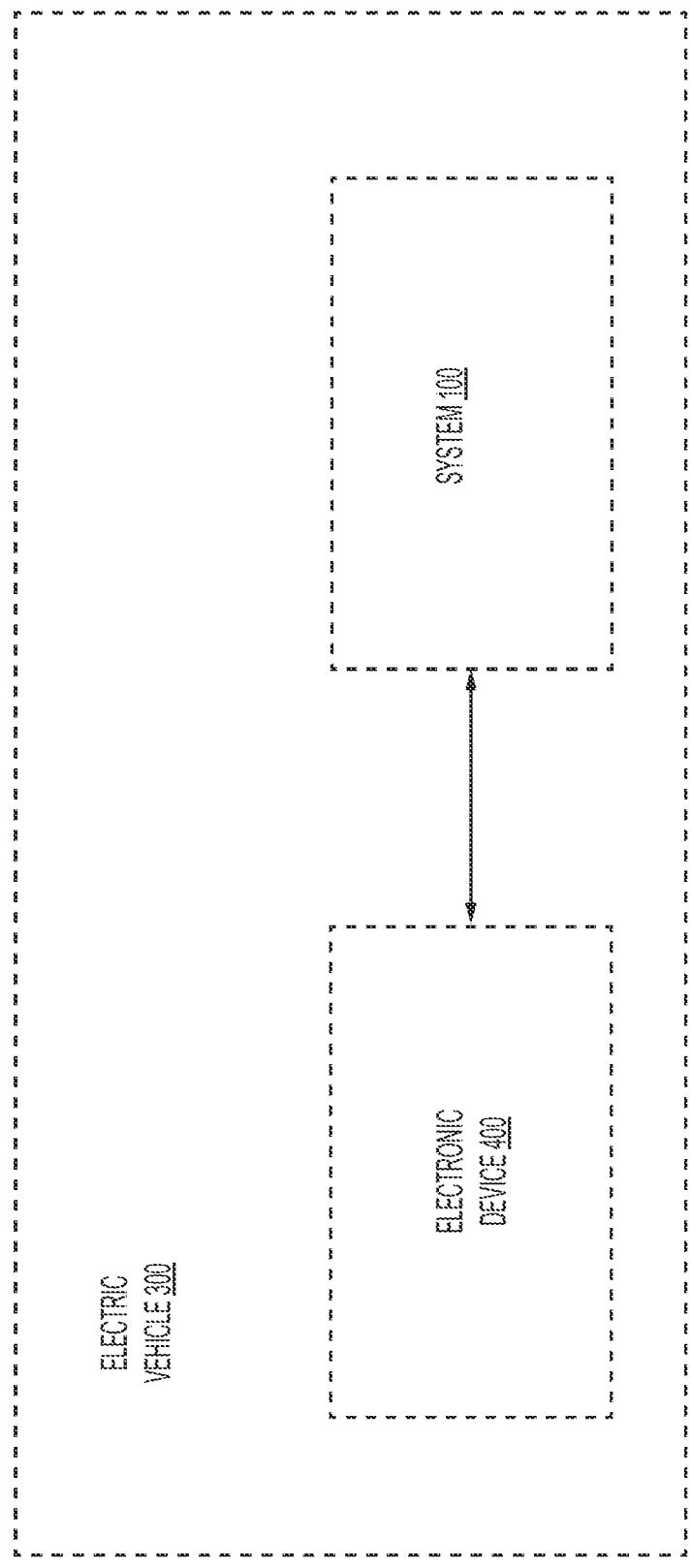
FIG. 5 is a diagram of an electric vehicle including an electronic device and the system, for connecting a capacitor to main bus bars, including a bent capacitor bus bar.

The capacitor 110 may be a DC-link capacitor, a bulk capacitor, or the like, and may be used in conjunction with an electronic device 400 (e.g., an electronic control unit (ECU), an inverter, a converter, etc.) of an electric vehicle 300 (as shown in FIG. 5. The capacitor 110 may be configured to stabilize an output of a power supply during situations where current is not available.

The bus bars of the present disclosure may be, for example, rigid conductors formed of a material having high conductivity, as a non-limiting example copper or copper alloy, so as to conduct a high current, for example more than 200 amperes. A bus bar may be used to construct an electrical circuit configured to carry high current. The bus bar may be coated with a conductive material, such as Nickel (Ni), Tin (Sn), Zinc (Zn), Ni-Palladium (Pd), Silver (Ag), Gold (Au), Aluminum (Al), Copper (Cu), or the like, in order to provide corrosion resistance for the bus bar.

As shown in FIGS. 1-5B, a Z direction (extending vertically on the page) may correspond to a vertical direction, an X direction (extending horizontally on the page) may correspond to a lateral direction, and a Y direction (extending into and out of the page) may correspond to a longitudinal direction. However, it should be understood that the Z, X, and Y directions, respectively, may correspond to any one of the vertical, lateral, and longitudinal directions. Accordingly, as used herein, "above," "below," "to the right side of," "to the left side of," etc., may be relative terms that might, or might not, correspond to actual spatial orientations of the components when implemented in an electric vehicle. As used herein, "substantially perpendicular" may refer to a first surface being provided at an angle of 90° to a second surface, or within a threshold angle to the second surface (e.g., 85°, 95°, etc.). As used herein, "substantially planar" may refer to a first surface being provided at an angle of 0° to a second surface, or within a threshold angle of the second surface (e.g., 5°, −5°, etc.).

The system 100 may be incorporated into an electric vehicle 300, as shown in FIG. 5. As a particular example, the system 100 may be used in conjunction with an electronic device 400 (e.g., an inverter, a converter, an electronic control unit (ECU), or the like) of the electric vehicle 300. Alternatively, the system 100 may be incorporated into a renewable energy device, a medical device, a consumer device, or the like.

As shown in FIGS. 1A and 1B, the capacitor 110 may be provided above the first main bus bar 120. The first main bus bar 120 may be provided above the second main bus bar 130. The first capacitor bus bar 140 may be provided on a first side, e.g., a left side of the capacitor 110. The second capacitor bus bar 150 may be provided on a second side, opposite of the first side, e.g., a right side of the capacitor 110.

The first main bus bar 120 and the second main bus bar 130 may connect to a power supply of the electric vehicle 300, and may connect various components to the power supply of the electric vehicle 300. The first main bus bar 120 may be a positive bus bar and the second main bus bar 130 may be a negative bus bar. Alternatively, the first main bus bar 120 may be a negative bus bar, and the second main bus bar 130 may be a positive bus bar.

The capacitor 110 may connect to the first main bus bar 120 and the second main bus bar 130 via the first capacitor bus bar 140 and the second capacitor bus bar 150, respectively. The capacitor 110 may be integrated with the first capacitor bus bar 140 and the second capacitor bus bar 150. Alternatively, the capacitor 110 may be connected to the first capacitor bus bar 140 and the second capacitor bus bar 150 via any suitable connection technique, such as via laser welding. The first capacitor bus bar 140 and the second capacitor bus bar 150 may be connected to the first main bus bar 120 and the second main bus bar 130 via any suitable connection technique, such as via laser welding.

The first main bus bar 120 may include a first cavity (or opening) 160 extending in the Z direction. The first capacitor bus bar 140 may extend into the first cavity 160. The first capacitor bus bar 140 may include an internal surface 141 that faces towards (any may be in direct contact with) the capacitor 110, and an external surface 142 that faces away from the capacitor 110. A portion of internal surface 141 may be laser welded via a first weld 170 to an internal surface, e.g., circumferential surface 161 of the first cavity 160 of the first main bus bar 120. Alternatively, the first capacitor bus bar 140 may be laser welded to another surface of the first main bus bar 120, such as an external side surface, an internal side surface, an internal surface, an external surface, etc.

The second capacitor bus bar 150 may include an internal surface 151 that faces towards (and may be in direct contact with) the capacitor 110, and an external surface 152 that faces away from the capacitor 110. The second capacitor bus bar 150 may include a first portion 153 and a second portion 154. The first portion 153 may extend along the capacitor 110 in the Z direction, and may be substantially perpendicular to the second main bus bar 130. The second portion 154 may extend substantially perpendicularly from the first portion 153 in the X direction, may extend substantially planar to the second main bus bar 130 in the X direction, and may include a bend. The first portion 153 is substantially perpendicular to the second portion 154. The second portion 154 may be positioned within the second cavity 180, and may be positioned between the first main bus bar 120 and the second main bus bar 130. The external surface 152 of the second portion 154 may contact the second main bus bar 130.

More specifically, the internal surface 151 of the second portion 154 of the second capacitor bus bar 150 may be substantially planar to an internal surface 131 of the second main bus bar 130. The internal surface 131 of the second main bus bar 130 may face towards the capacitor 110. In this way, the second capacitor bus bar 150 may be "bent" due to the orientation of the first portion 153 and the second portion 154.

As shown in FIG. 1B, the first capacitor bus bar 140 may extend into the first cavity 160. Further, the internal surface 141 of the first capacitor bus bar 140 may be connected to the first main bus bar 120 via a first weld 170. For example, the first capacitor bus bar 140 may be laser welded to the internal circumferential surface 161 of the first cavity 160 of the first main bus bar 120, to an external surface of the first main bus bar 120, to an internal surface of the first main bus bar 120, etc.

As further shown in FIG. 1B, the first portion 153 of the second capacitor bus bar 150 may extend into the second cavity 180 of the first main bus bar 120. Further, the second portion 154 of the second capacitor bus bar 150 may be provided in the second cavity 180 of the first main bus bar 120. The external surface 152 of the second portion 154 of the second capacitor bus bar 150 may contact the internal surface 131 of the second main bus bar 130. Further, the external surface 152 of the second portion 154 of the second capacitor bus bar 150 may be connected to the internal surface 131 of the second main bus bar 130 via a second weld 200. For example, the second capacitor bus bar 150 may be laser welded to the second main bus bar 130.

Alternatively, in some embodiments, the first main bus bar 120 might not include the second cavity 180. In this case, the second capacitor bus bar 150 may extend around the first main bus bar 120 to avoid contact with the first main bus bar 120, and extend towards and contact the second main bus bar 130. For example, the second capacitor bus bar 150 may extend in the Y direction to avoid the first main bus bar 120 and contact the second main bus bar 130.

The system 100 may facilitate connection between the first capacitor bus bar 140, the first main bus bar 120, the second capacitor bus bar 150, and the second main bus bar 130 while accommodating for various dimensional variations of the capacitor 110. That is, the first weld 170 and the second weld 200 may be made despite dimensional variations of the capacitor 110 because the second portion 154 of the second capacitor bus bar 150 extends in the X direction which provides for an overlap between the second main bus bar 130 and the second capacitor bus bar 150.

The length of the second portion 154 may be selected based on the dimensions of the capacitor 110, the dimensions of the first main bus bar 120, the dimensions of the second cavity 180, the dimensions of the second main bus bar 130, the dimensions of the third cavity 190, or the like. In any event, the length of the second portion 154 may be selected so that a threshold amount of the internal surface 131 of the second main bus bar 130 overlaps with the external surface 152 of the second portion 154 of the second capacitor bus bar 150.

Figure 2A:
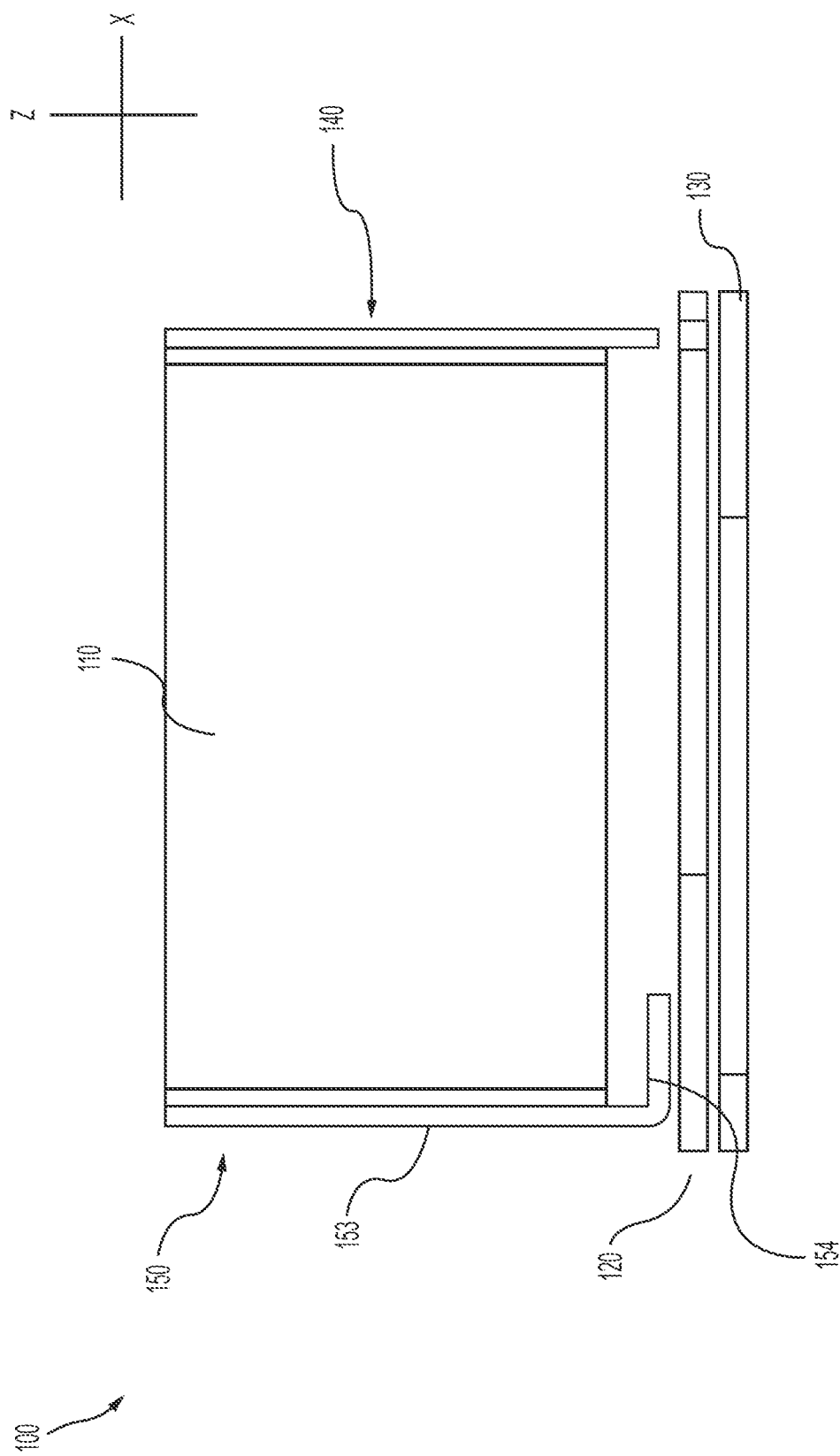
FIGS. 2A and 2B are diagrams of a system, for connecting a capacitor to main bus bars, including a bent capacitor bus bar on a bottom left side.
Figure 2B:
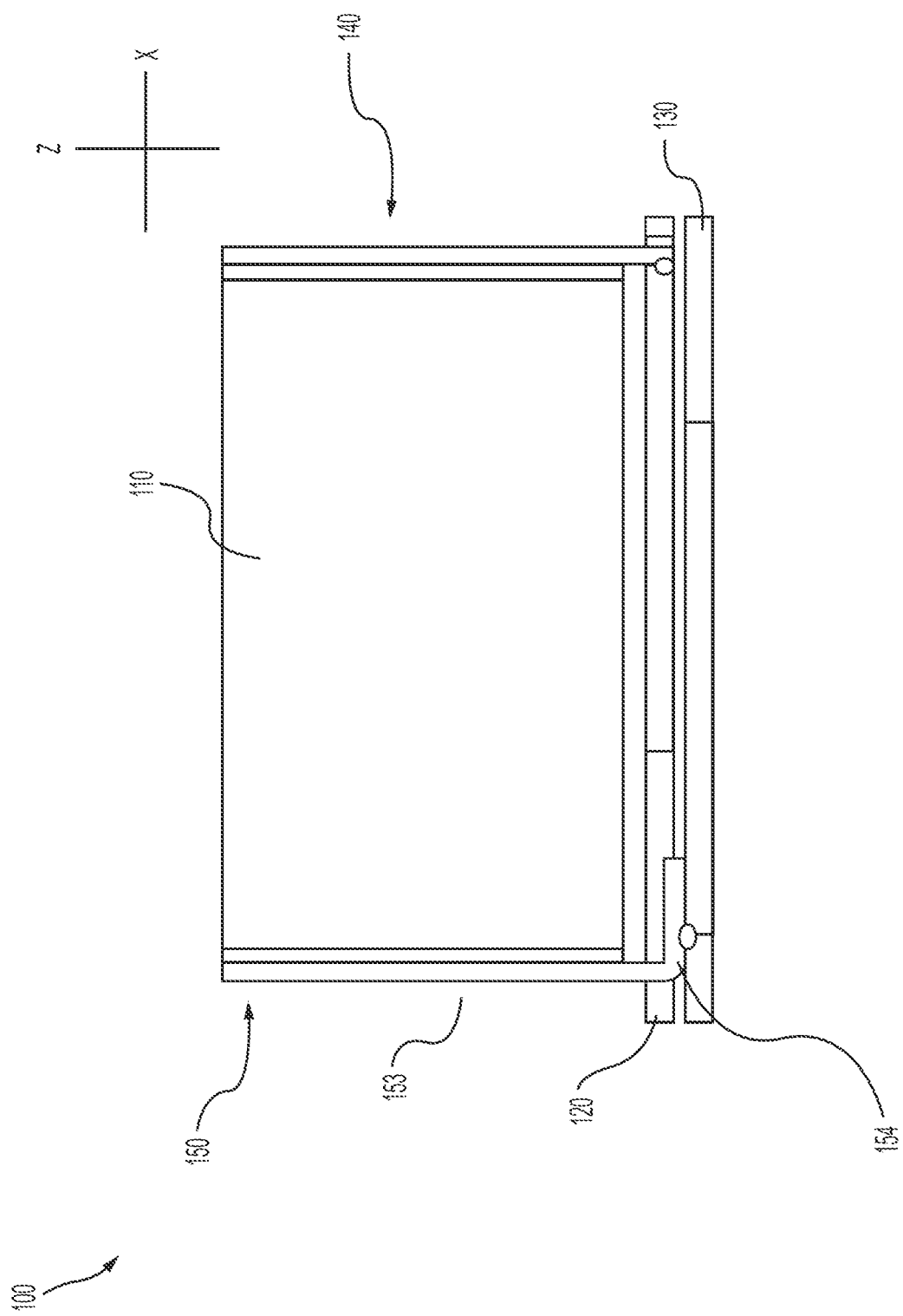
Figure 3A:
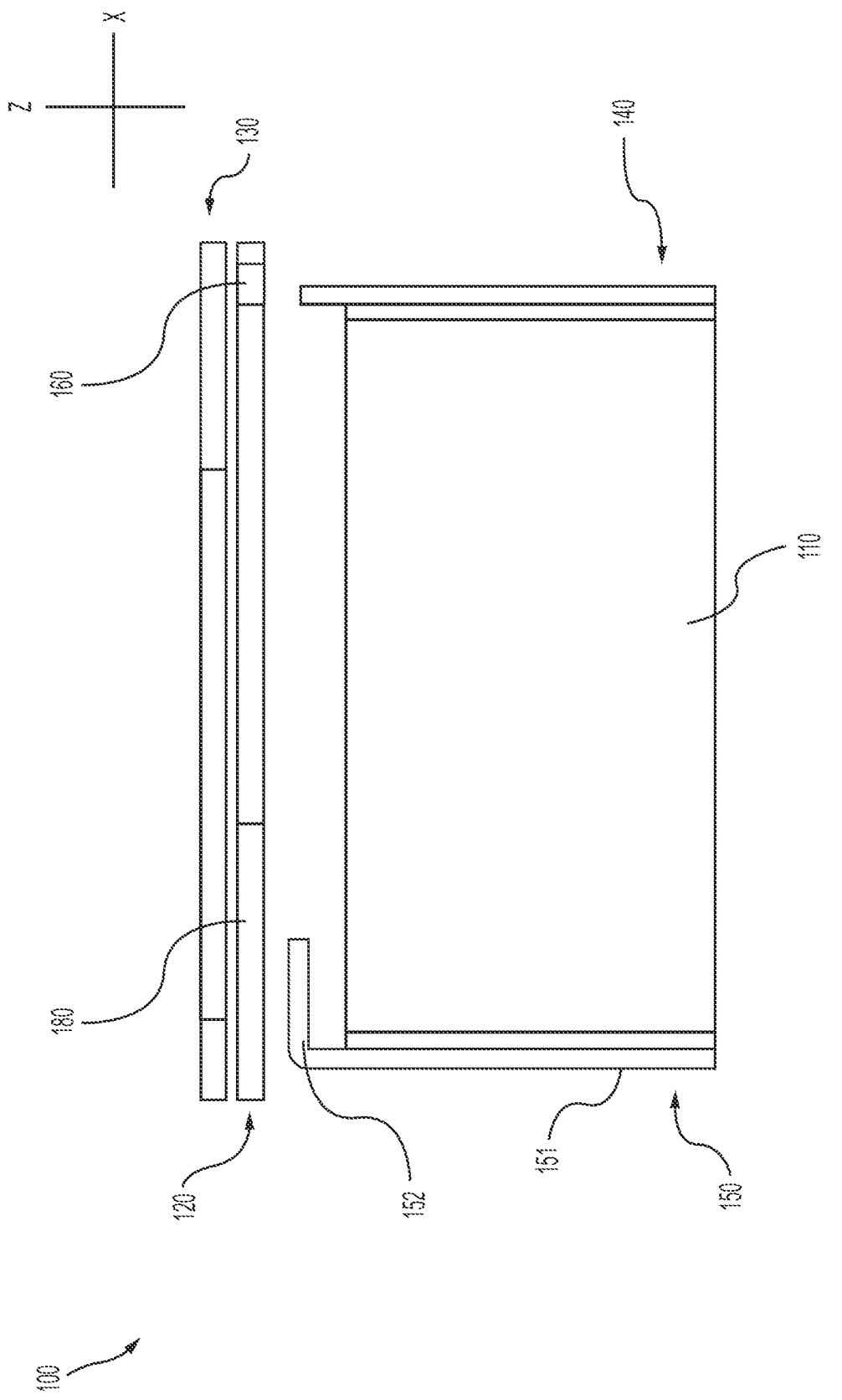
FIGS. 3A and 3B are diagrams of a system, for connecting a capacitor to main bus bars, including a bent capacitor bus bar on a top left side.
Figure 3B:
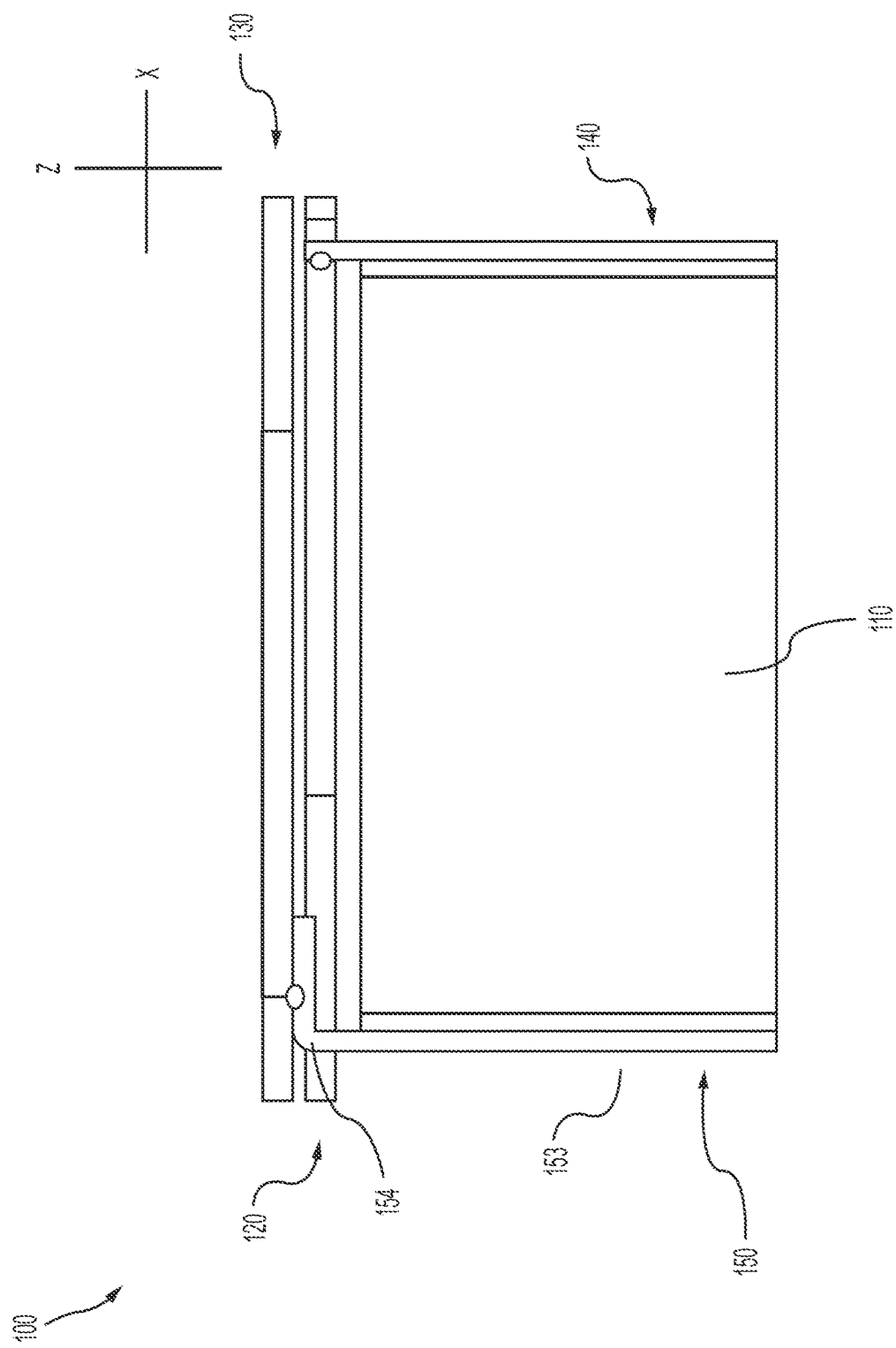
Figure 4A:
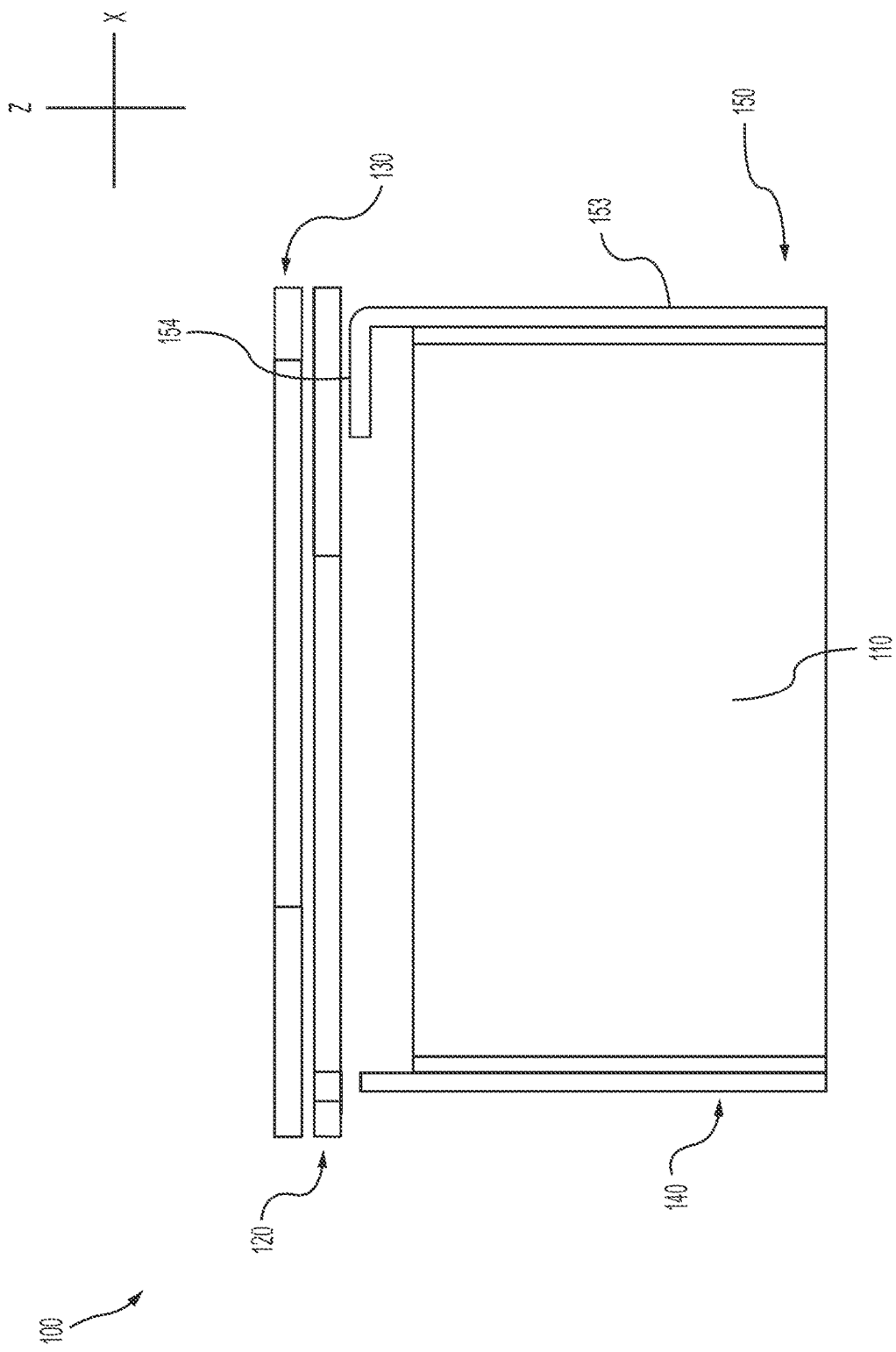
FIGS. 4A and 4B are diagrams of a system, for connecting a capacitor to main bus bars, including a bent capacitor bus bar on a top right side.
Figure 4B:
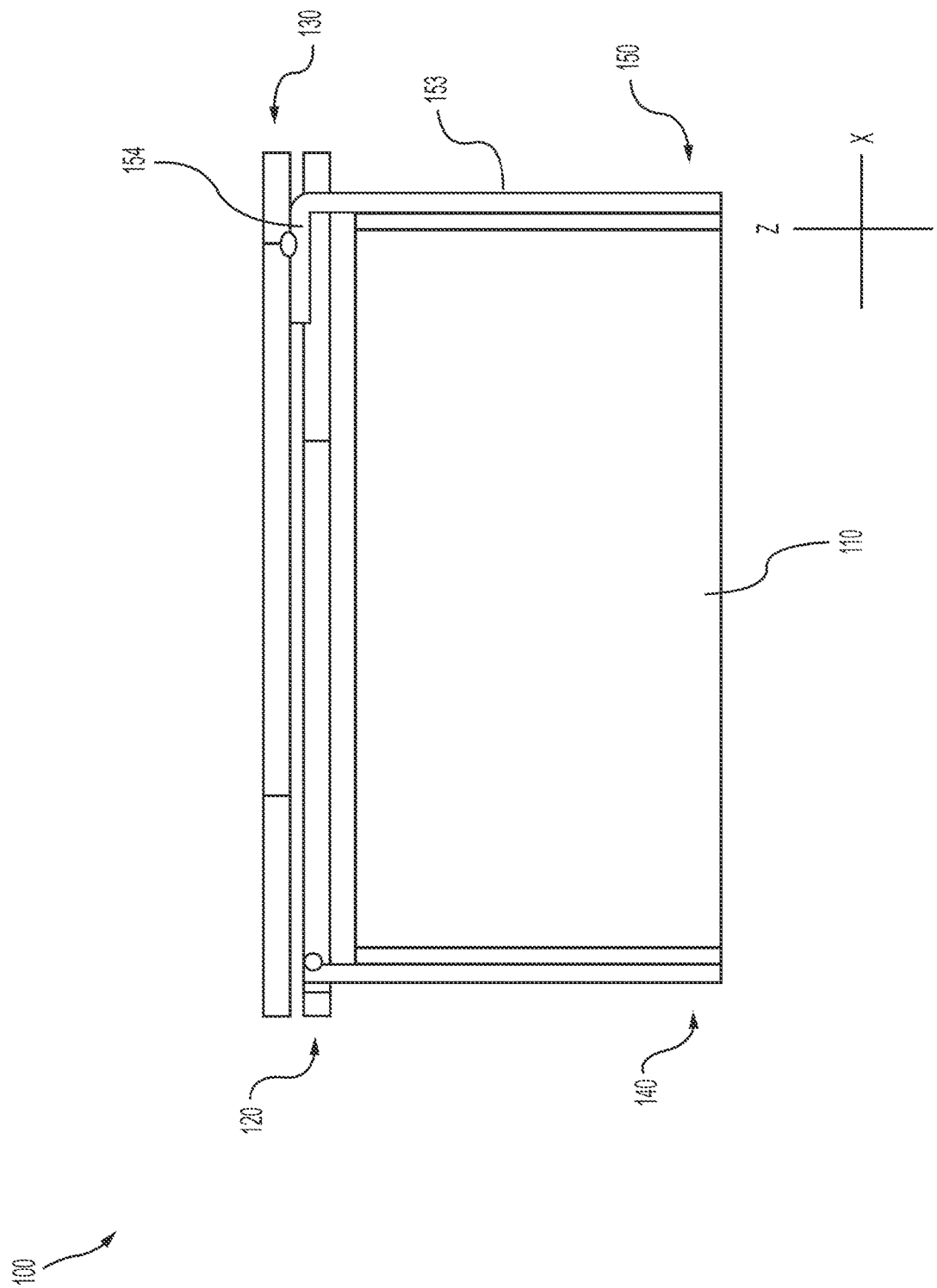

Although FIGS. 1A and 1B depict the second portion 154 as being on a bottom right side of the capacitor 110, it should be understood that the second portion 154 may be provided on any other side of the capacitor 110. For example, as shown in FIGS. 2A and 2B, the second portion 154 may be provided on a bottom left side of the capacitor 110. As another example, and as shown in FIGS. 3A and 3B, the second portion 154 may be provided on a top left side of the capacitor 110. As yet another example, and as shown in FIGS. 4A and 4B, the second portion 154 may be provided on a top right side of the capacitor 110. Further, although the present disclosure depicts a single bent capacitor bus bar, it should be understood that the system 100 may include two bent capacitor bus bars.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

We claim:

1. A system comprising:
a capacitor for an electronic device of an electric vehicle;
a main bus bar, wherein the main bus bar includes a main bus bar cavity; and
a capacitor bus bar configured to connect the capacitor to the main bus bar,
wherein the capacitor bus bar includes a first portion that is perpendicular to the main bus bar,
wherein the capacitor bus bar includes a second portion that extends from the first portion, that is perpendicular to the first portion, and that is planar with the main bus bar, and
wherein the capacitor bus bar is welded to the main bus bar such that an external surface of the second portion of the capacitor bus bar facing away from the capacitor is welded to an internal surface of the main bus bar facing towards the capacitor.

2. The system of claim 1, wherein the capacitor is a DC-link capacitor.

3. The system of claim 1, wherein the capacitor is provided above the main bus bar in a vertical direction, and the capacitor bus bar is provided on a side of the capacitor in a horizontal direction.

4. The system of claim 1, wherein the capacitor is provided below the main bus bar in a vertical direction, and the capacitor bus bar is provided on a side of the capacitor in a horizontal direction.

5. The system of claim 1, further comprising:
a second main bus bar; and
a second capacitor bus bar, wherein the second main bus bar includes a cavity through which the second capacitor bus bar extends.

6. The system of claim 1, further comprising:
a second main bus bar; and
a second capacitor bus bar, wherein the second main bus bar includes a cavity through which the second capacitor bus bar extends, and wherein the second capacitor bus bar is welded to a side surface of the cavity.

7. The system of claim 1, further comprising:
a second main bus bar; and
a second capacitor bus bar, wherein the second main bus bar includes a cavity through which the capacitor bus bar extends.

8. The system of claim 1, further comprising:
a second main bus bar,
wherein the second main bus bar has a first and second cavity, wherein the capacitor bus bar extends through the first cavity; and a second capacitor bus bar configured to connect the capacitor to the second main bus bar such that the second capacitor bus bar extends through the second cavity.

9. The system of claim 1, further comprising:
a second main bus bar,
wherein the second main bus bar includes a cavity; and
a second capacitor bus bar configured to connect the capacitor to the second main bus bar,
wherein the second capacitor bus bar includes a first and second end, and
wherein the second capacitor bus bar is welded to a side surface of the cavity such that the second end of the second capacitor bus bar terminates within the cavity.

10. The system of claim 1, further comprising:
a second main bus bar, wherein the second main bus bar includes a cavity through which the capacitor bus bar extends.

11. The system of claim 1, wherein the capacitor bus bar consists of the first portion and the second portion extending therefrom.

12. The system of claim 11, wherein the entirety of the first portion is planar to the capacitor and the entirety of the second portion is perpendicular to the capacitor.

13. The system of claim 1, wherein the first portion is planar to the capacitor and the second portion is perpendicular to the capacitor.

14. A system comprising:
a capacitor for an electronic device of an electric vehicle;
a first main bus bar;
a second main bus bar, wherein the second main bus bar has a first and second cavity;
a first capacitor bus bar configured to connect the capacitor to the first main bus bar,
wherein the first capacitor bus bar includes a first portion that is perpendicular to the first main bus bar, and
wherein the first capacitor bus bar includes a second portion that extends from the first portion, that is perpendicular to the first portion, and that is planar with the first main bus bar such that the first capacitor bus bar extends through the first cavity; and
a second capacitor bus bar configured to connect the capacitor to the second main bus bar such that the second capacitor bus bar extends through the second cavity.

15. The system of claim 14, wherein the capacitor is a DC-link capacitor.

16. The system of claim 14, wherein the capacitor is provided above the first and second main bus bars in a vertical direction, the first capacitor bus bar is provided on a first side of the capacitor in a horizontal direction, and the second capacitor bus bar is provided on a second side of the capacitor in a horizontal direction.

17. The system of claim 14, wherein the capacitor is provided below the first and second main bus bars in a vertical direction, the first capacitor bus bar is provided on a first side of the capacitor in a horizontal direction, and the second capacitor bus bar is provided on a second side of the capacitor in a horizontal direction.

18. A system comprising:
a capacitor for an electronic device of an electric vehicle;
a first main bus bar;
a second main bus bar,
wherein the second main bus bar includes a cavity;
a first capacitor bus bar configured to connect the capacitor to the first main bus bar,
wherein the first capacitor bus bar includes a first portion that is perpendicular to the first main bus bar, and
wherein the first capacitor bus bar includes a second portion that extends from the first portion, that is perpendicular to the first portion, and that is planar with the first main bus bar; and
a second capacitor bus bar configured to connect the capacitor to the second main bus bar,
wherein the second capacitor bus bar includes a first and second end, and
wherein the second capacitor bus bar is welded to a side surface of the cavity such that the second end of the second capacitor bus bar terminates within the cavity.

19. The system of claim 18, wherein the capacitor is a DC-link capacitor.

20. The system of claim 18, wherein the capacitor is provided above the first and second main bus bars in a vertical direction, the first capacitor bus bar is provided on a first side of the capacitor in a horizontal direction, and the second capacitor bus bar is provided on a second side of the capacitor in a horizontal direction.

* * * * *